US009842316B2

(12) United States Patent
Caldwell et al.

(10) Patent No.: US 9,842,316 B2
(45) Date of Patent: *Dec. 12, 2017

(54) CLOUD-BASED BROKER SERVICE FOR DIGITAL ASSISTANTS

(71) Applicant: Microsoft Technology Licensing, LLC, Redmond, WA (US)

(72) Inventors: Gary L. Caldwell, Redmond, WA (US); Steven Paul Geffner, Bothell, WA (US); C. Joe Coplen, Kirkland, WA (US); Christopher Hugh Pratley, Seattle, WA (US); Michael H. Ammerlaan, Sammamish, WA (US); Steven Todd Zaske, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,123

(22) Filed: Nov. 23, 2015

(65) Prior Publication Data

US 2016/0078405 A1    Mar. 17, 2016

Related U.S. Application Data

(63) Continuation of application No. 13/229,042, filed on Sep. 9, 2011, now Pat. No. 9,195,968.

(51) Int. Cl.
*G06F 3/00* (2006.01)
*G06Q 10/10* (2012.01)
(Continued)

(52) U.S. Cl.
CPC .......... *G06Q 10/107* (2013.01); *G06Q 10/10* (2013.01); *G06Q 10/109* (2013.01);
(Continued)

(58) Field of Classification Search
USPC ................. 726/1, 7; 713/155; 709/202, 206
See application file for complete search history.

(56) References Cited

U.S. PATENT DOCUMENTS 7,991,637 B1 *  8/2011  Guiheneuf ........... G06Q 10/109
                                              705/7.18
9,195,968 B2   11/2015  Caldwell et al.
(Continued)

FOREIGN PATENT DOCUMENTS

| CA | 2787351 A1  | 9/2011 |
| CN | 1531289 A   | 9/2004 |
| CN | 101479723 A | 7/2009 |

OTHER PUBLICATIONS

U.S. Appl. No. 13/229,042, filed Sep. 9, 2011 entitled "Cloud-Based Broker Service for Digital Assistants".
(Continued)

*Primary Examiner* — Baotran N To
*Assistant Examiner* — Sayed Beheshti Shirazi (57) ABSTRACT

A cloud-based broker service may be provided for computing devices in a distributed computing environment. The broker service may aggregate user accounts and user account credentials utilized for accessing online services by the computing devices. The broker service may monitor a context of the computing devices associated with the user accounts. The broker service may then utilize the context, data associated with the user accounts and data associated with the user account credentials to automate tasks and/or provide alerts associated with the data.

20 Claims, 8 Drawing Sheets

(51) Int. Cl.
*H04L 29/06* (2006.01)
*H04L 29/08* (2006.01)
*H04W 12/08* (2009.01)

(52) U.S. Cl.
CPC ..... *G06Q 10/1095* (2013.01); *H04L 63/0815* (2013.01); *H04L 67/10* (2013.01); *H04L 67/18* (2013.01); *H04L 67/2809* (2013.01); *H04W 12/08* (2013.01)

(56) References Cited

U.S. PATENT DOCUMENTS

| | | | | |
|---|---|---|---|---|
| 2004/0201622 A1* | 10/2004 | Rhodes | ............... | G06Q 10/10 715/751 |
| 2007/0005409 A1* | 1/2007 | Boss | ............... | G06Q 10/1095 705/7.19 |
| 2008/0034315 A1* | 2/2008 | Langoulant | ............... | G06Q 10/109 715/780 |
| 2008/0249969 A1* | 10/2008 | Tsui | ............... | H02J 7/0055 706/46 |
| 2009/0083106 A1* | 3/2009 | Bhogal | ............... | G06Q 10/1095 705/7.19 |
| 2009/0089133 A1* | 4/2009 | Johnson | ............... | G06Q 10/1097 705/7.21 |
| 2009/0192702 A1* | 7/2009 | Bourne | ............... | G01C 21/20 701/532 |
| 2009/0222382 A1* | 9/2009 | Kobza | ............... | G01J 3/0208 705/50 |
| 2009/0234659 A1* | 9/2009 | Liao | ............... | G06Q 10/047 705/5 |
| 2009/0286557 A1* | 11/2009 | Clipsham | ............... | G08B 1/08 455/457 |
| 2009/0299807 A1* | 12/2009 | Schiller | ............... | G06Q 10/1093 705/7.18 |
| 2009/0327019 A1* | 12/2009 | Addae | ............... | G06Q 10/109 705/7.18 |
| 2010/0070758 A1* | 3/2010 | Low | ............... | H04W 4/08 713/155 |
| 2010/0316355 A1* | 12/2010 | Bumgardner | ............... | G11B 27/034 386/292 |
| 2010/0332282 A1* | 12/2010 | Bradley | ............... | G01C 21/3438 705/7.19 |
| 2011/0066468 A1* | 3/2011 | Huang | ............... | G01C 21/3438 705/7.19 |
| 2011/0090078 A1* | 4/2011 | Kim | ............... | G06Q 10/109 340/522 |
| 2011/0112971 A1* | 5/2011 | Wynn | ............... | G06Q 10/10 705/301 |
| 2011/0130958 A1* | 6/2011 | Stahl | ............... | G01C 21/362 701/533 |
| 2011/0177830 A1* | 7/2011 | Clipsham | ............... | G08B 1/08 455/456.3 |
| 2011/0195727 A1* | 8/2011 | Proulx | ............... | G06Q 10/109 455/456.3 |
| 2011/0211813 A1* | 9/2011 | Marks | ............... | G06F 17/3089 386/297 |
| 2011/0257881 A1* | 10/2011 | Chen | ............... | G01C 21/362 701/465 |
| 2011/0320518 A1* | 12/2011 | Tsui | ............... | H02J 7/0055 709/202 |
| 2011/0320546 A1* | 12/2011 | Holden | ............... | G06F 9/5083 709/206 |
| 2013/0007092 A1* | 1/2013 | Gudmundsen | ............... | G06Q 10/10 709/202 |
| 2013/0036369 A1* | 2/2013 | Mitchell | ............... | G06Q 50/00 715/753 |
| 2013/0067549 A1 | 3/2013 | Caldwell et al. | | |

OTHER PUBLICATIONS

China Office Action and Search Report Issued in Patent Application No. 201210330921.5, dated Sep. 24, 2014, 16 Pages.
China Second Office Action Issued in Patent Application No. 201210330921.5, dated Jun. 2, 2015, 12 Pages.
China Third Office Action Issued in Chinese Patent Application No. 201210330921.5, dated Nov. 27, 2015, 13 Pages.

* cited by examiner

MOBILE COMPUTING DEVICE

CLOUD-BASED BROKER SERVICE FOR DIGITAL ASSISTANTS

RELATED APPLICATIONS

This application is a continuation of U.S. application Ser. No. 13/229,042, now U.S. Pat. No. 9,195,968, filed Sep. 9, 2011, entitled Cloud-Based Broker Service For Digital Assistants.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Currently, online computing services enable users to store credentials for user accounts and other data utilized for interacting with online services (such as calendar services, mapping services etc.) in a distributed computing environment comprising one or more remote computing systems. Current systems allow users to store credentials online either to integrate data for easier viewing or for later recall. However, these systems fail to provide any services which act on a user's behalf with minimal user guidance. In particular, current systems are pool oriented and thus fail to combine user data in a proactive manner thereby providing enhanced services to the user. For example, various online services may store a user's appointment calendar in connection with one user account and also provide a traffic monitoring service in connection with another user account. Using current services, a user having an appointment at a remote location would be required to access a portal or website providing current traffic condition data and further determine from this data, based on the user's present location, if there are any traffic issues which might affect the user's departure or arrival time for the appointment. Non-online computing services, such as mobile devices, also allow for the aggregation of information for easier viewing but are limited (due to battery life and background processing features) in providing services which combine user data in a proactive manner. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for providing a broker service to computing devices in a distributed computing environment. The broker service may aggregate multiple accounts and account credentials utilized for accessing online services. The broker service may also monitor a context of one or more computing devices associated with the multiple accounts. The broker service may also utilize the context of the one or more computing devices, data associated with the multiple accounts and data associated with the account credentials for automating tasks and/or providing alerts associated with the data.

These and other features and advantages will be apparent from a reading of the following detailed description and a review of the associated drawings. It is to be understood that both the foregoing general description and the following detailed description are illustrative only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Embodiments are provided for providing a broker service to computing devices in a distributed computing environment. The broker service may aggregate multiple accounts and account credentials utilized for accessing online services. The broker service may also monitor a context of one or more computing devices associated with the multiple accounts. The broker service may also utilize the context of the one or more computing devices, data associated with the multiple accounts and data associated with the account credentials for automating tasks and/or providing alerts associated with the data.

Figure 1:
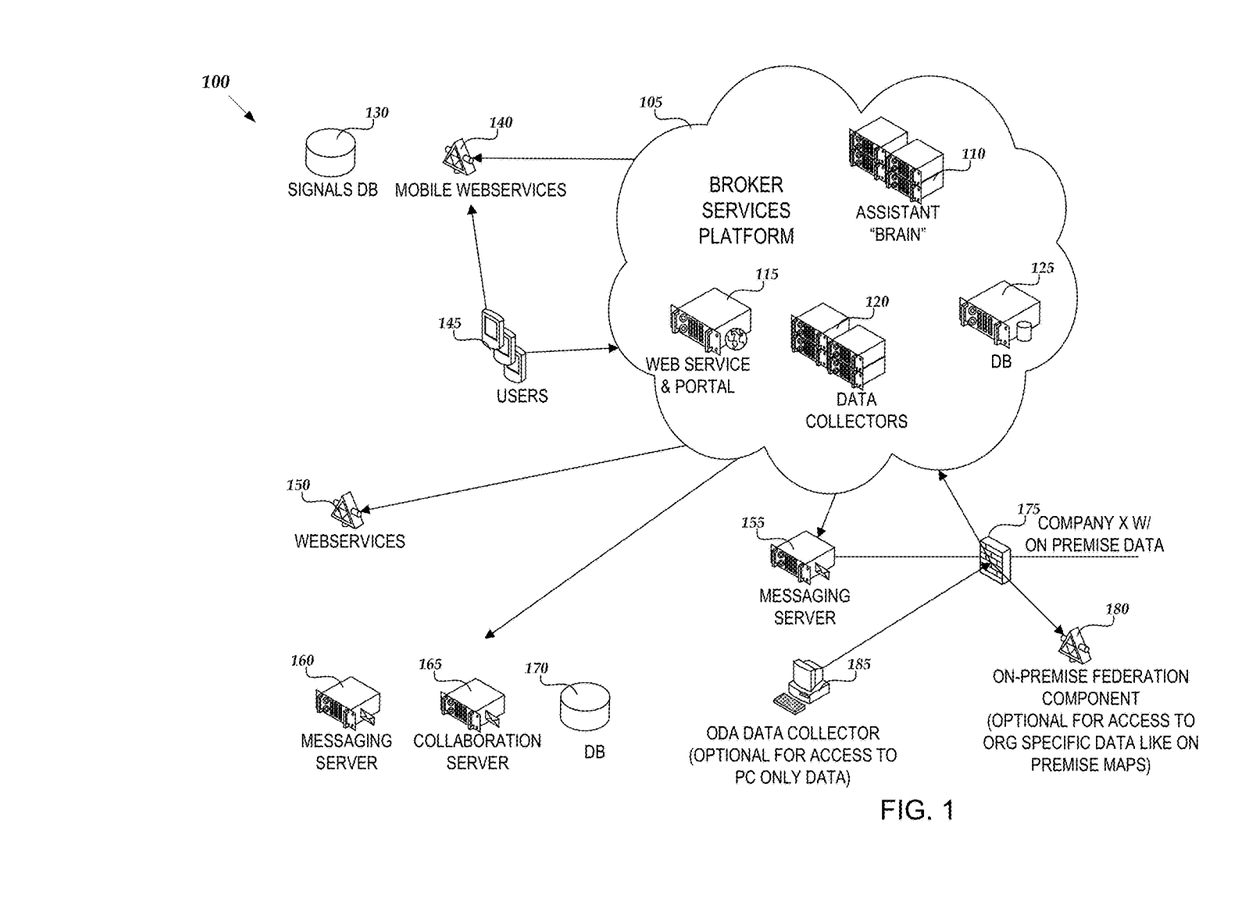
FIG. 1 shows a network architecture for providing a broker service to computing devices in a distributed computing environment, in accordance with an embodiment.

FIG. 1 shows a network architecture 100 for providing a broker service to computing devices in a distributed computing environment, in accordance with an embodiment. The network architecture 100 includes a cloud-based broker service 105 (hereinafter referred to as the "cloud component 105") which is in communication with mobile web service 140, a signals database 130, user mobile computing devices 145, web service 150, messaging server 160, collaboration server 165, database 170, messaging server 155, firewall 175, data collector 185 and federation component 180.

In accordance with an embodiment, the cloud component 105 hosts user data and user account information and further acts on behalf of the user. In accordance with an embodiment, the cloud component 105 may comprise a generic cloud-based service for implementing an online broker such as the WINDOWS AZURE PLATFORM service from MICROSOFT CORPORATION of Redmond, Wash. It should be appreciated that the online broker may also be hosted and deployed as a component of a specific cloud-based service such as the OFFICE 365 software services platform or the BING search engine, both of which are from MICROSOFT CORPORATION of Redmond, Wash. The cloud component 105 may comprise the following sub-components: a database 125, data collectors 120, assistant ("brain") 110, and web services and portal 115. The database 125 may store user account information (for accessing online services) and cached representations of those accounts to serve as contexts for each user. A context includes account data plus derived user preferences and real-time context such as a user location from mobile devices (e.g., mobile computing devices). The data collectors 120 may comprise an extensible set of worker roles that collect data periodically and at real-time from the services for which a user has provided account information. These services may comprise, for example, web-based social networking services or on-premise services accessed through federation web service components. It should be appreciated that additional data collectors may be added at any time and the results of this collection stored in the database 125 to serve as a context of a user. The assistant 110 may comprise a component which constantly monitors the user's context for changes and exceptional cases and performs actions on the user's behalf such as generating user alerts. The assistant 110 may leverage external services unrelated to the user's context to gain additional insights such as news services or search engine services for traffic and routing information. It should be understood that the assistant 110 is also extensible and additional modules may be added to the system to perform additional behavior. In accordance with an embodiment, a user may specify which modules to enable and optionally add additional modules from an online catalog. The web services and portal 115 may comprise a web services layer that provides continuous access to the broker and its data to mobile client devices as well as receive real-time updates of the context of those devices. The web services and portal 115 may further comprise a portal which may include a web-based version of a mobile client device and which also serves as a sign-up and on-boarding experience for a user.

In accordance with an embodiment, the federation component 180 may be configured to allow an enterprise (i.e., a corporation) to expose enterprise-only data to users that are also employees. The federation component 180 may be registered with the cloud component 105 and allow the enterprise to control who can see their data. The federation component 180 may comprise a set of web services that are Internet-accessible but secured to communicate only with the cloud component 105. The federation component 180 may further comprise a layer which may be extensible with additional "plug-an-play" modules. Functionality exposed at the later may include, but is not limited to, corporate directories with hierarchy and profile information, corporate facilities information and indoor maps, corporate social contexts of users, events and alerts delivery from internal systems, and activity from internal systems that may be of interest to users.

The data collector 185 may comprise a machine level collector that may be deployed by individuals to gather information specific to their computing devices. The information may include, but is not necessarily limited to, the following: most recently accessed local documents, Internet browsing history and shortcuts, and application state and current user work states.

The user mobile computing devices 145 may execute client side mobile applications, such as the mobile web services 140, that serve as a user's view port into the current state of the accounts they have enabled as well as an endpoint for the online broker to communicate with the user. The mobile web services 140 may comprise support for push notifications and location-based support of the user mobile computing devices 145. The online broker may further leverage various features of the user mobile computing devices 145 including, but not limited to, receiving signals indicating a current location (e.g., GPS, etc.) of a user, push notifications to send alerts to a user, and a contact store for determining a social graph of the user. For example, data corresponding to signals indicating a user's current location (e.g., GPS data) may be stored in the signals database 130.

The web services 150 may comprise any number of web-based services including social networking services. An illustrative web-based service includes the WINDOWS LIVE web services from MICROSOFT CORPORATION of Redmond, Wash. In accordance with an embodiment, the messaging servers 155 and 160 may comprise one or more applications for providing electronic mail, calendaring, contacts and tasks as well as support for mobile and web-based access to information and support for data storage. In accordance with an embodiment, the messaging servers 155 and 160 may comprise the EXCHANGE messaging server software from MICROSOFT CORPORATION of Redmond, Wash. The collaboration server 165 may comprise one or more applications for providing a number of collaborative services such as the managing and provisioning of intranet portals, extranets and websites, document management and file management, collaboration spaces, social networking tools, enterprise search, business intelligence tooling, process/information integration, and third-party developed solutions. In accordance with an embodiment, the collaboration server 165 may comprise the SHAREPOINT SERVER collaboration software from MICROSOFT CORPORATION of Redmond, Wash. The database 170 may be utilized to store data from the messaging server 160 and the collaboration server 165.

Figure 2:
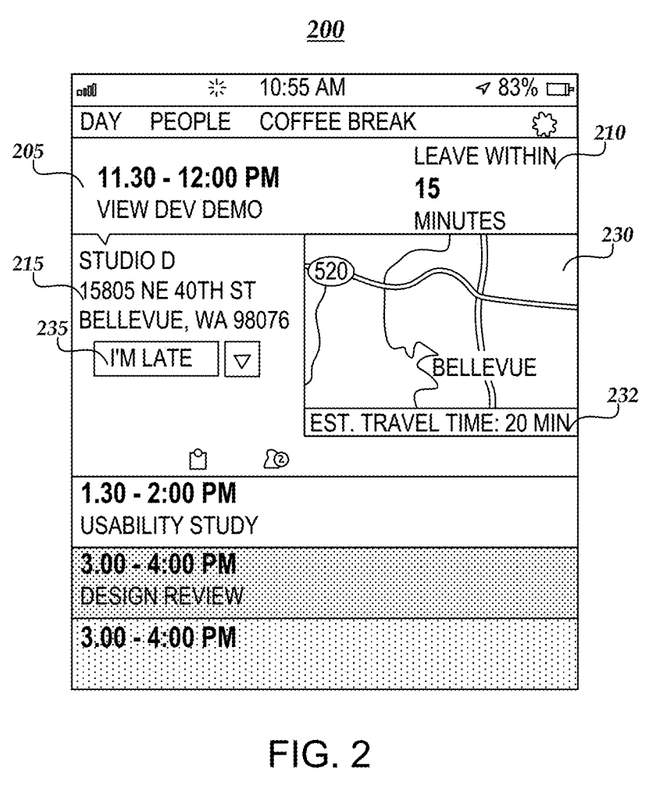
FIG. 2 is a computer screen display of a computing device showing features provided by the network architecture of FIG. 1, in accordance with an embodiment.

FIG. 2 is a computer screen display 200 of a computing device showing features provided by the network architecture of FIG. 1, in accordance with an embodiment. In accordance with an embodiment, the display 200 may comprise scheduling/calendar information and an associated map on a mobile computing device, such as a smartphone or tablet computer. In particular, the display 200 may include a scheduled appointment 205, a notification 210, an appointment address 215, a map 230 including the appointment location (i.e., "Bellevue"), an estimated travel time 232 to the appointment location shown on the map 230 from a current location of the computing device, and a user control 235 for sending a message associated with the scheduled appointment. Thus, as will be described in greater detail below with respect to FIG. 4, the broker service may leverage multiple data sources (including GPS or location data, traffic websites, user calendar information, etc.) to generate a notification which provides a user with enhanced information with respect to getting to a scheduled appointment on-time. For example, the broker service may determine an estimated travel time to a scheduled appointment based on the current location of a user's mobile computing device as well as routing guidance (via the map 230) to assist the user in getting to the appointment location. The broker service may also determine, based on the estimated travel time, how much time a user has before he or she needs to leave for the appointment. The broker service may also provide a messaging feature which allows the user to alert someone at the appointment destination as to whether or not the user will be running late for the appointment.

Figure 3:
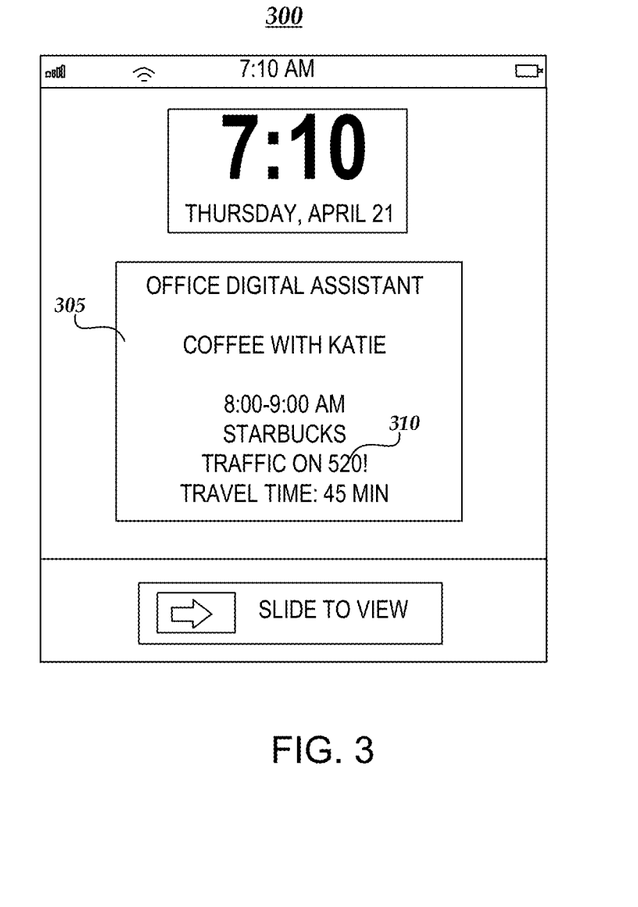
FIG. 3 is a computer screen display of a computing device showing features provided by network architecture of FIG. 1, in accordance with an embodiment.

FIG. 3 is a computer screen display 300 of a computing device showing features provided by the network architecture of FIG. 1, in accordance with an embodiment. In accordance with an embodiment, the display 300 may comprise scheduling/calendar information which is shown as a notification or alert 305 and which may be "pushed" from the broker service to a mobile computing device, such as a smartphone or tablet computer. The alert 305 may include a name, time and location of a scheduled appointment, as well as an estimated travel time. In addition, the alert may further include current traffic condition information 310 (i.e., "Traffic on 520!") which may be obtained by the broker service from a traffic monitoring website, for example. Thus, as will be described in greater detail below with respect to FIG. 4, the broker service may leverage multiple data sources (including GPS or location data, traffic websites, user calendar information, etc.) to provide generate an alert which provides a user with enhanced information with respect to getting to a scheduled appointment on-time.

Figure 4:
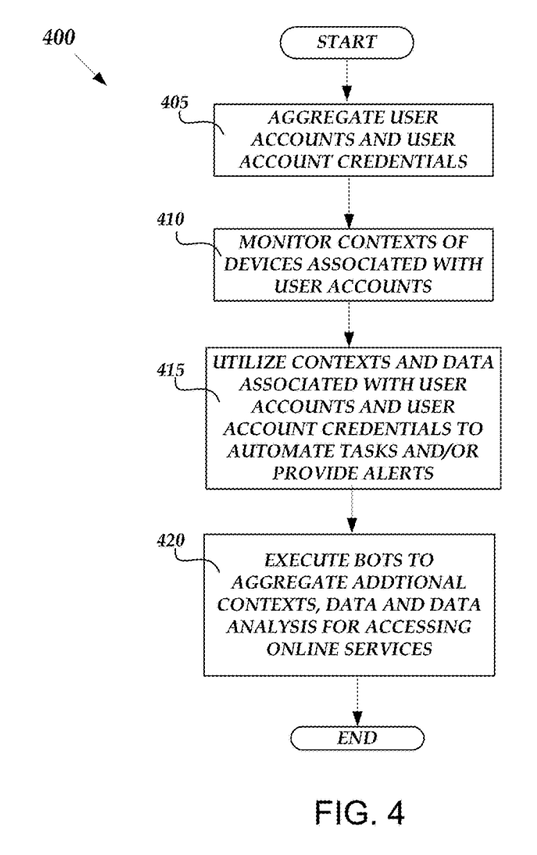
FIG. 4 is a flow diagram illustrating a routine for providing a broker service to computing devices in a distributed computing environment, in accordance with an embodiment.

FIG. 4 is a flow diagram illustrating a routine 400 for providing a broker service to computing devices in a distributed computing environment, in accordance with an embodiment. When reading the discussion of the routine presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405, where the sub-components in the cloud component 105 (discussed above with respect to FIG. 1) may be utilized to execute applications for aggregating accounts and account credentials utilized for accessing online services. The accounts may include home and work accounts for a single user as well as multiple individual accounts for multiple users. The account credentials may include user names and passwords which may be required to act on the accounts on the user's (or users') behalf. In accordance with an embodiment, the cloud component 105 may be configured to collect and store user credentials for accessing one or more online services including, but not limited to, a calendar service, an e-mail service and a web service (which may include, for example, a web-based search engine or a social networking service). It should be understood, that in accordance with an embodiment, the accounts and the account credentials may comprise restricted access accounts and restricted access credentials for accessing federation online services. The federation online services may include services that may only be accessed by employees of a corporation such as on-premise collaboration services data and indoor maps of corporate facilities.

From operation 405, the routine 400 continues to operation 410, where the cloud component applications may be utilized to monitor a context of one or more computing devices associated with the accounts. In accordance with an embodiment, the context may comprise signals received by a mobile computing device. The signals may correspond to a current physical location (i.e., GPS location) of a mobile computing device.

From operation 410, the routine 400 continues to operation 415, where the cloud component applications may utilize the context of one or more computing devices as well as data associated with the accounts and the account credentials for automating tasks and/or providing alerts associated with the data. For example, in accordance with an embodiment, the cloud component applications may perform the following tasks: access a calendar service to schedule a new appointment for one or more users associated with one or more user accounts, determine existing scheduled appointments for the user accounts, determine any priorities that may be associated with each of the existing scheduled appointments, and automatically rearrange the existing scheduled appointments which have a lower priority than the new appointment to schedule the new appointment for the user accounts. The cloud component applications may further be configured to utilize an e-mail service to send a message regarding the scheduling of the new appointment to other user accounts which are not associated with the calendar service. Thus, it should be appreciated that, in accordance with embodiments, a broker service may be utilized to leverage the priority of meetings/appointments to determine when an existing appointment can be moved to another timeslot. The broker service may also be utilized to rearrange existing appointments across multiple user calendars to make room for higher priority appointments. In addition, for users not using the broker service, communications such as e-mail can be prepared and sent to these users in order to streamline the process of negotiation of meeting times and availability. In accordance with another embodiment, the cloud component applications may be utilized to access a calendar service to determine a scheduled appointment associated with the mobile computing device and to send a calendar alert for the scheduled appointment to the mobile computing device based on the current physical location of the mobile computing device. The alert may include an estimated travel time to the scheduled appointment, a traffic alert, and routing guidance to the scheduled appointment (e.g., via a map) without providing manual searching on a user's behalf. It should be further understood that, in accordance with other embodiments, the broker service may be utilized for sharing documents and e-mail messages with other users. For example, the components of the broker service may be utilized to show documents to members of a workgroup or team that were read/created by other team members in a corporation. The broker service components may also be utilized for surfacing (i.e., sending) important documents to other team members for review in a relatively short amount of time. The broker service components may further be utilized for surfacing (i.e., sending) important e-mails from fellow team members or for surfacing unread e-mails (which have been read by other team members), to a particular team member.

From operation 415, the routine 400 continues to operation 420, where the cloud component applications may optionally include bots which may be executed for aggregating additional context, data or analysis of existing data (i.e., data analysis) for accessing the online services. In particular, embodiments comprise extensibility of online and federated services to add bots to be developed and plugged into a system to allow for the collection of additional context, data or analysis of existing data. As should be understood by those skilled in the art, bots are software applications that may run automated tasks over a network, such as the Internet. From operation 420, the routine 400 then ends.

Figure 5:
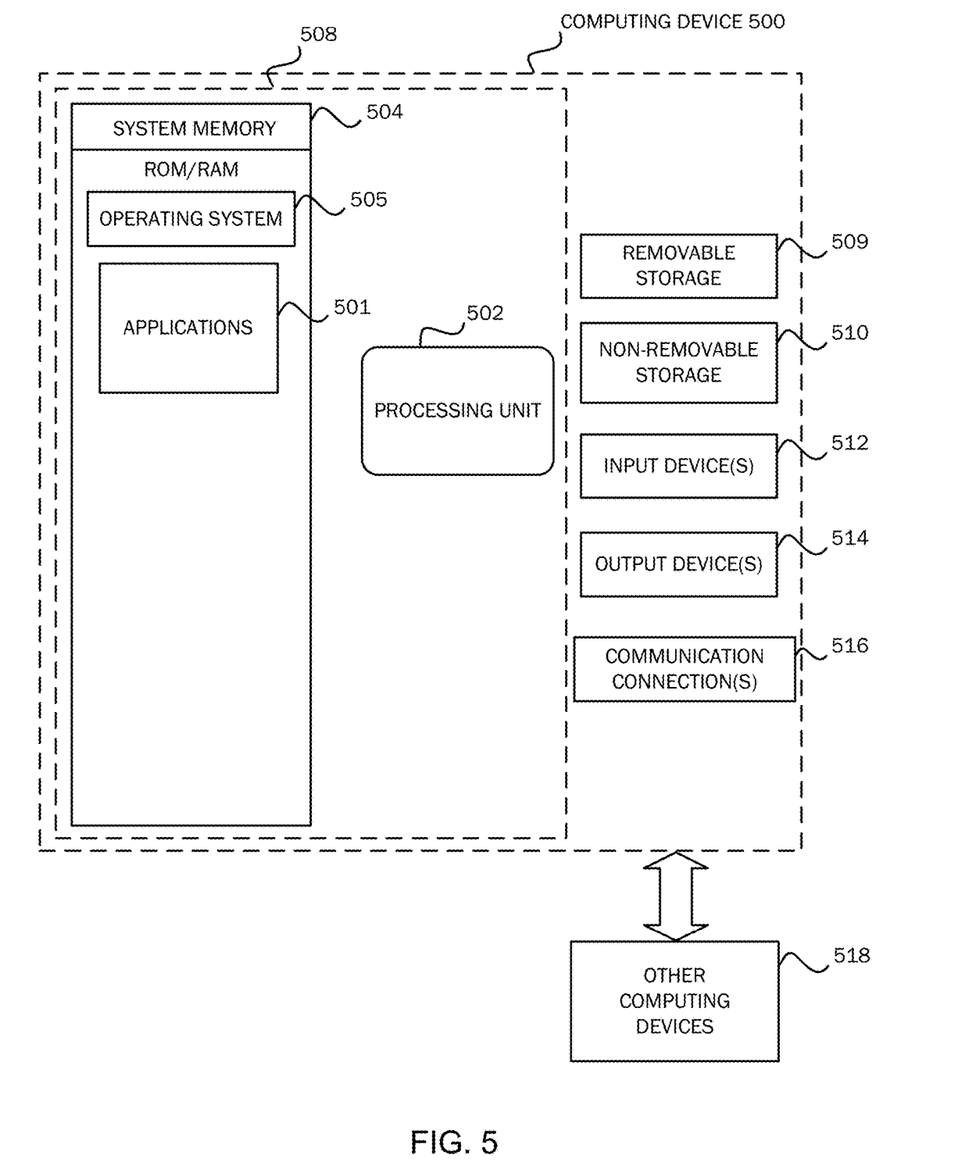
FIG. 5 is a simplified block diagram of a computing device with which various embodiments may be practiced.

FIG. 5 is a block diagram illustrating example physical components of a computing device 500 with which various embodiments may be practiced. The computing device components described below may be suitable for the computing device described above with respect to FIGS. 1-4. In a basic configuration, the computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and applications 501. Operating system 505, for example, may be suitable for controlling computing device 500's operation. It should be understood that the embodiments described herein may also be practiced in conjunction with other operating systems and application programs and further, is not limited to any particular application or system.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage 509 and a non-removable storage 510.

While executing on the processing unit 502 of the computing device 500, the applications 501 may perform including, for example, one or more of the operations in routine 400 described above. The aforementioned routines are examples, and the processing unit 502 may perform other routines. Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the applications 501 may operate via application-specific logic integrated with other components of the computing device/system 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Various embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 500. Any such computer storage media may be part of the computing device 500. The computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
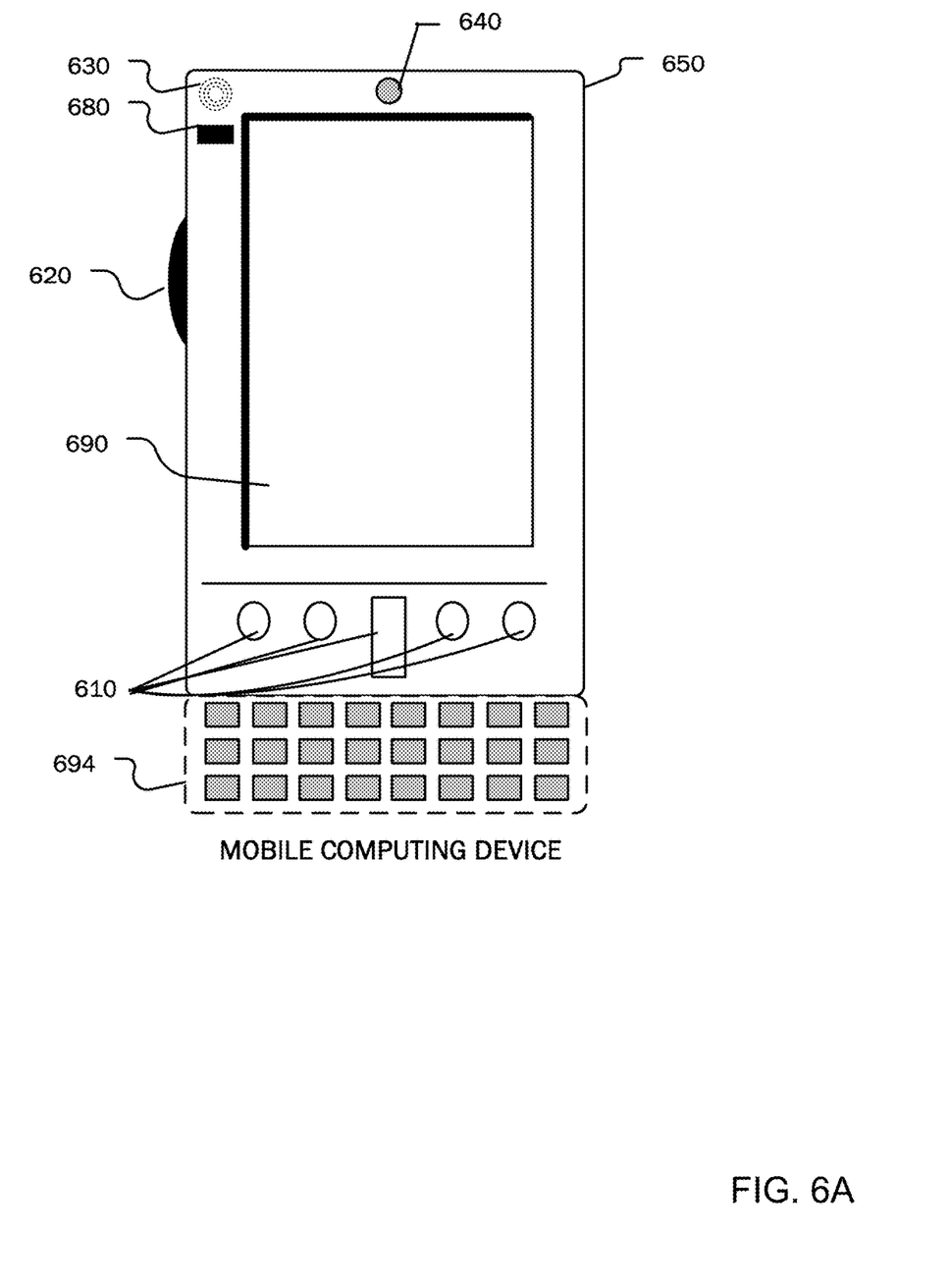
FIG. 6A is a simplified block diagram of a mobile computing device with which various embodiments may be practiced.
Figure 6B:
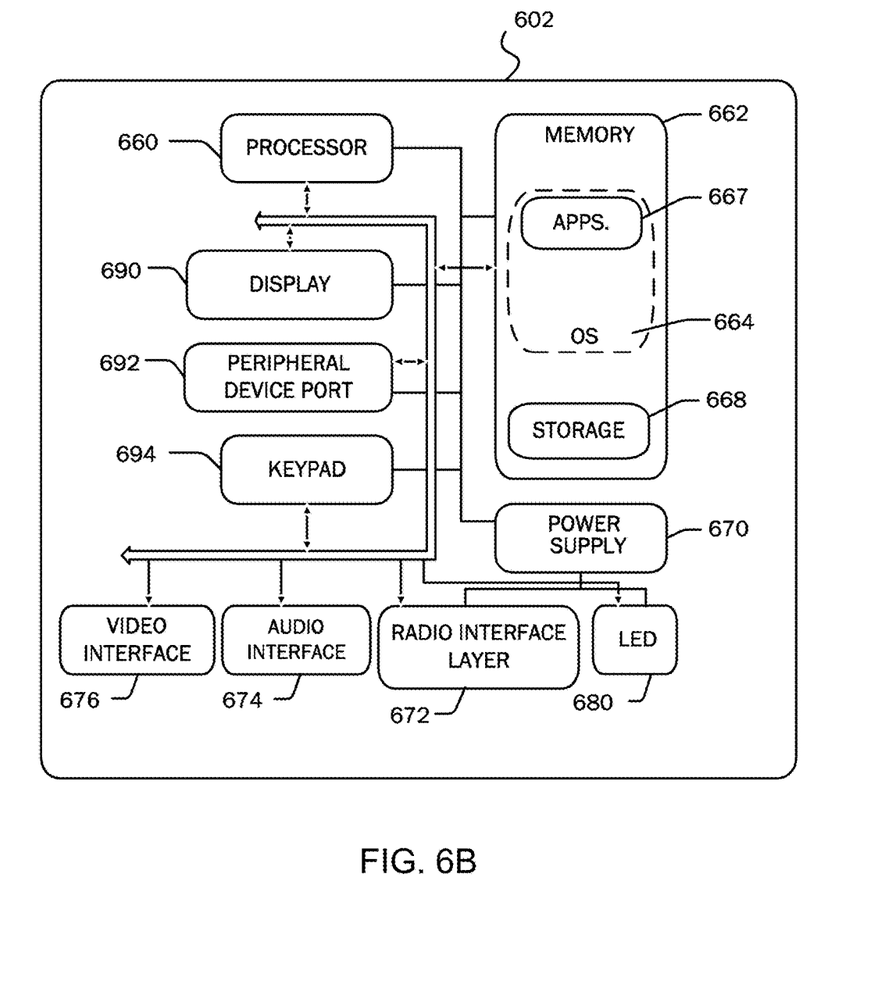
FIG. 6B is a simplified block diagram of a mobile computing device with which various embodiments may be practiced.

FIGS. 6A and 6B illustrate a suitable mobile computing environment, for example, a mobile telephone 650, a smartphone, a tablet personal computer, a laptop computer, and the like, with which various embodiments may be practiced. With reference to FIG. 6A, an example mobile computing device 650 for implementing the embodiments is illustrated. In a basic configuration, mobile computing device 650 is a handheld computer having both input elements and output elements. Input elements may include touch screen display 690 and input buttons 610 that allow the user to enter information into mobile computing device 650. Mobile computing device 650 may also incorporate an optional side input element 620 allowing further user input. Optional side input element 620 may be a rotary switch, a button, or any other type of manual input element. In alternative embodiments, mobile computing device 650 may incorporate more or less input elements. For example, display 690 may not be a touch screen in some embodiments. In yet another alternative embodiment, the mobile computing device is a portable phone system, such as a cellular phone having display 690 and input buttons 610. Mobile computing device 650 may also include an optional keypad 694. Optional keypad 694 may be a physical keypad or a "soft" keypad generated on the touch screen display.

Mobile computing device 650 incorporates output elements, such as display 690, which can display a graphical user interface (GUI). Other output elements include speaker 630 and LED light 680. Additionally, mobile computing device 650 may incorporate a vibration module (not shown), which causes mobile computing device 650 to vibrate to notify the user of an event. In yet another embodiment, mobile computing device 650 may incorporate a headphone jack (not shown) for providing another means of providing output signals.

Although described herein in combination with mobile computing device 650, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 6B is a block diagram illustrating components of a mobile computing device used in one embodiment, such as the computing device shown in FIG. 6A. That is, mobile computing device 650 can incorporate a system 602 to implement some embodiments. For example, system 602 can be used in implementing a "smartphone" that can run one or more applications similar to those of a desktop or notebook computer. In some embodiments, the system 602 is integrated as a computing device, such as an integrated personal digital assistant (PDA) and wireless phone.

The applications 667 may be loaded into memory 662 and run on or in association with an operating system 664. The system 602 also includes non-volatile storage 668 within memory the 662. Non-volatile storage 668 may be used to store persistent information that should not be lost if system 602 is powered down. A synchronization application (not shown) also resides on system 602 and is programmed to interact with a corresponding synchronization application resident on a host computer to keep the information stored in the non-volatile storage 668 synchronized with corresponding information stored at the host computer. As should be appreciated, other applications may also be loaded into the memory 662 and run on the device 650.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of OS 664. In other words, communications received by the radio 672 may be disseminated to the applications 667 via OS 664, and vice versa.

The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The embodiment of the system 602 is shown with two types of notification output devices; an LED 680 that can be used to provide visual notifications and an audio interface 674 that can be used with speaker 630 to provide audio notifications. These devices may be directly coupled to the power supply 670 so that when activated, they remain on for a duration dictated by the notification mechanism even though processor 660 and other components might shut down for conserving battery power. The LED 680 may be programmed to remain on indefinitely until the user takes action to indicate the powered-on status of the device. The audio interface 674 is used to provide audible signals to and receive audible signals from the user. For example, in addition to being coupled to speaker 630, the audio interface 674 may also be coupled to a microphone (not shown) to receive audible input, such as to facilitate a telephone conversation. In accordance with embodiments of the present invention, the microphone may also serve as an audio sensor to facilitate control of notifications. The system 602 may further include a video interface 676 that enables an operation of on-board camera 630 to record still images, video stream, and the like.

A mobile computing device implementing the system 602 may have additional features or functionality. For example, the device may also include additional data storage devices (removable and/or non-removable) such as, magnetic disks, optical disks, or tape. Such additional storage is illustrated in FIG. 6B by storage 668. Computer storage media may include volatile and nonvolatile, removable and non-removable media implemented in any method or technology for storage of information, such as computer readable instructions, data structures, program modules, or other data.

Data/information generated or captured by the device 650 and stored via the system 602 may be stored locally on the device 650, as described above, or the data may be stored on any number of storage media that may be accessed by the device via the radio 672 or via a wired connection between the device 650 and a separate computing device associated with the device 650, for example, a server computer in a distributed computing network such as the Internet. As should be appreciated such data/information may be accessed via the device 650 via the radio 672 or via a distributed computing network. Similarly, such data/information may be readily transferred between computing devices for storage and use according to well-known data/information transfer and storage means, including electronic mail and collaborative data/information sharing systems.

Figure 7:
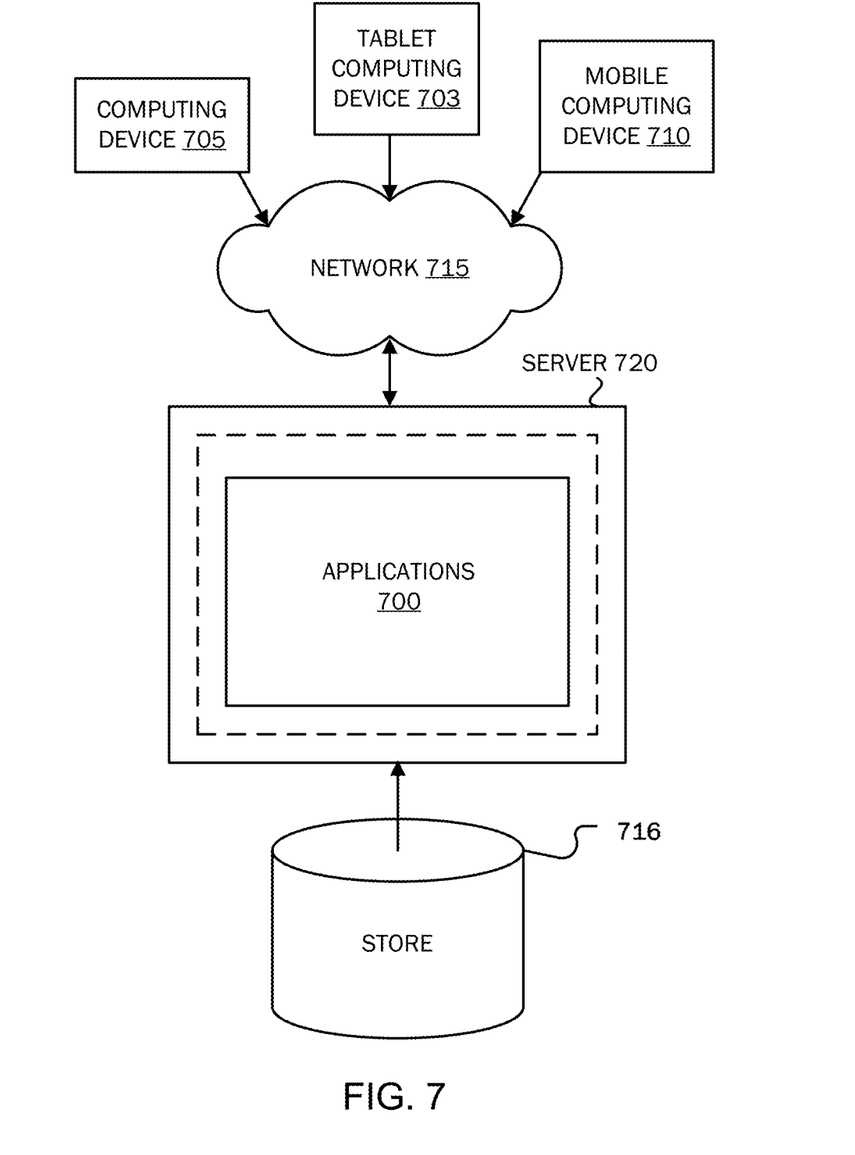
FIG. 7 is a simplified block diagram of a distributed computing system in which various embodiments may be practiced.

FIG. 7 is a simplified block diagram of a distributed computing system in which various embodiments may be practiced. The distributed computing system may include number of client devices such as a computing device 705, a tablet computing device 703 and a mobile computing device 710. The client devices 705, 703 and 710 may be in communication with a distributed computing network 715 (e.g., the Internet). A server 720 is in communication with the client devices 705, 703 and 710 over the network 715. The server 720 may store applications 700 which may be perform routines including, for example, one or more of the operations in routine 400 described above.

Various embodiments are described above with reference to block diagrams and/or operational illustrations of methods, systems, and computer program products according to embodiments of the invention. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the invention.

It will be apparent to those skilled in the art that various modifications or variations may be made without departing from the scope or spirit of the invention. Other embodiments will be apparent to those skilled in the art from consideration of the specification and practice of the invention disclosed herein.

What is claimed is:

1. A method for providing a broker service to computing devices in a distributed computing environment, comprising:
aggregating, in the distributed computing environment, a plurality of account data including first calendar data for a first account type of a first user, a first different calendar data for a second account type of the first user, second calendar data for the first account type of a second user, and a second different calendar data for the second account type of the second user;
aggregating, in the distributed computing environment, a plurality of account credentials utilized for accessing online services related to the first calendar data for the first user and the second calendar data for the second user;
receiving a request to schedule a new calendar appointment, the new calendar appointment having a specified time and invitees including the first and second users and a new appointment priority;
determining the new calendar appointment is for the first account type;
based on the determination that the new calendar appointment is for the first account type, determining a priority associated with a conflicting calendar event based on the first calendar data for the first account type of the first user and the second calendar data for the first account type of the second user;
determining the priority associated with the conflicting calendar event is lower than the new appointment priority associated with the new calendar appointment;
upon determining that the priority associated with the conflicting calendar event is lower than the new appointment priority associated with the new calendar appointment, automatically rearranging the conflicting calendar event for the first and second users; and
sending an alert based on rearranging the conflicting calendar event.

2. The method of claim 1, wherein the plurality of account credentials include user credentials for accessing one or more of the following: a calendar service, an e-mail service and a web service.

3. The method of claim 2, further comprising monitoring signals received by a mobile computing device of the first user, the signals corresponding to a current physical location of the mobile computing device.

4. The method of claim 1, further comprising utilizing an e-mail service to send a message regarding the scheduling of the new appointment to other user accounts.

5. The method of claim 1, wherein the alert is sent to a mobile computing device of the first user and is based on a current physical location of the mobile computing device, the alert comprising one or more of the following: an estimated travel time to the rearranged conflicting appointment, a traffic alert, and routing guidance to the rearranged conflicting appointment.

6. The method of claim 1, wherein aggregating, in the distributed computing environment, a plurality of account data comprises aggregating a plurality of restricted access accounts and a plurality of restricted access credentials for accessing federation online services.

7. A computer-readable hardware device comprising computer-executable instructions which, when executed by a computer, will cause the computer to perform a method for providing a broker service, the method comprising:
aggregating a plurality of accounts and a plurality of account credentials utilized for accessing online services, the plurality of account credentials comprising credentials for accessing a calendar service, first calendar data for a first account type of a first user, a first different calendar data for a second account type of the first user, second calendar data for the first account type of a second user, and a second different calendar data for the second account type of the second user;
receiving a request to schedule a new calendar appointment, the new calendar appointment having invitees including the first and second users and a new appointment priority;
determining the new calendar appointment is for the first account type;
based on the determination that the new calendar appointment is for the first account type, determining a priority associated with a conflicting calendar event based on the first calendar data for the first account type of the first user and the second calendar data for the first account type of the second user;

determining the priority associated with the conflicting calendar event is lower than the new appointment priority associated with the new calendar appointment;

upon determining that the priority associated with the conflicting calendar event is lower than the new appointment priority associated with the new calendar appointment, automatically rearranging the conflicting calendar event for the first and second users; and sending an alert based on rearranging the conflicting calendar event.

8. The computer-readable hardware device of claim 7, wherein sending the alert is based on a current physical location of a mobile computing device of the first user, the alert comprising an estimated travel time to the new scheduled appointment, a traffic alert and routing guidance to the new appointment.

9. The computer-readable hardware device of claim 7, wherein aggregating a plurality of accounts and a plurality of account credentials utilized for accessing online services comprises aggregating a plurality of restricted access accounts and a plurality of restricted access credentials for accessing a federation calendar service, a federation e-mail service and a federation web service.

10. The computer-readable hardware device of claim 7, wherein the alert further comprises an option to alert another user that first user will be running late to the new appointment.

11. The computer-readable hardware device of claim 10, wherein the method further comprises receiving an indication that the first user will be late to the new appointment, and based on the received indication, sending an alert to the second user notifying the second user that the first user will be late.

12. A system for controlling calendar appointments in a distributed computing environment, the system comprising:

at least one processor; and memory storing instructions that, when executed by the at least on processor, perform a set of operations comprising:

aggregating a plurality of account data including account credentials utilized for accessing online services, first calendar data for a first account type of a first user, a first different calendar data for a second account type of the first user, second calendar data for the first account type of a second user, and a second different calendar data for the second account type of the second user;

receiving a request to schedule a new calendar appointment, the new calendar appointment having invitees including the first and second users and a new appointment priority;

determining the new calendar appointment is for the first account type;

based on the determination that the new calendar event is for the first account type, determining a priority associated with a conflicting calendar event based on the first calendar data for the first account type of the first user and the second calendar data for the first account type of the second user;

determining whether the priority associated with the conflicting calendar event is lower than the new appointment priority associated with the new calendar appointment; and upon determining that the priority associated with the conflicting calendar event is lower than the new appointment priority associated with the new calendar appointment, automatically rearranging the conflicting calendar event for the first and second users; and sending an alert based on rearranging the conflicting calendar event.

13. The system of claim 12, wherein the operations further comprise scheduling the new appointment for the first user and the second user.

14. The system of claim 13, wherein the operations further comprise accessing a location of a mobile device of the first user based on location data from the second account type of the first user.

15. The system of claim 14, wherein the operations further comprise, based on the tracked location and a location for the new appointment, alerting the first user via the mobile device of the new appointment.

16. The system of claim 15, wherein alerting the first user includes providing a travel time to the location of the new appointment.

17. The system of claim 16, wherein alerting the first user includes providing an option to indicate the first user will be late to the new appointment.

18. The system of claim 17, wherein the operations further comprise receiving an indication that the first user will be late to the new appointment, and in response to receiving the indication, alerting the second user that the first user will be late.

19. The system of claim 12, wherein the aggregating account credentials includes aggregating credentials for the first user and the second user.

20. The system of claim 12, wherein the first account type is an enterprise account and the second account type is a personal account.

* * * * *